United States Patent
Sweeney et al.

(10) Patent No.: US 9,148,759 B2
(45) Date of Patent: Sep. 29, 2015

(54) WIRELESS SERVICE PLATFORMS

(71) Applicant: CenturyLink Intellectual Property LLC, Denver, CO (US)

(72) Inventors: Jeffrey Sweeney, Tucson, AZ (US); Kelsyn Rooks, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 14/281,514

(22) Filed: May 19, 2014

(65) Prior Publication Data

US 2014/0256359 A1  Sep. 11, 2014

Related U.S. Application Data

(63) Continuation of application No. 13/872,465, filed on Apr. 29, 2013, now Pat. No. 8,768,317, which is a continuation of application No. 12/499,396, filed on Jul. 8, 2009, now Pat. No. 8,447,277.

(51) Int. Cl.

| | |
|---|---|
| *H04W 24/00* | (2009.01) |
| *H04W 4/02* | (2009.01) |
| *H04W 24/02* | (2009.01) |
| *H04W 68/00* | (2009.01) |
| *H04W 84/04* | (2009.01) |

(52) U.S. Cl.
CPC .............. *H04W 4/021* (2013.01); *H04W 24/02* (2013.01); *H04W 68/00* (2013.01); *H04W 84/045* (2013.01)

(58) Field of Classification Search
USPC .......... 455/432.3, 435.1, 435.2, 404.2, 414.1, 455/414.2, 440, 456.1, 456.2, 45, 6.3, 455/456.6; 705/5, 6; 709/224, 206
See application file for complete search history.

(56) References Cited

U.S. PATENT DOCUMENTS

| | | | |
|---|---|---|---|
| 6,061,558 | A | 5/2000 | Kennedy et al. |
| 6,065,120 | A | 5/2000 | Laursen et al. |
| 6,961,559 | B1 | 11/2005 | Chow et al. |
| 7,046,782 | B2 | 5/2006 | Miller |
| 7,623,857 | B1 | 11/2009 | O'Neil et al. |
| 7,676,550 | B1 | 3/2010 | Jachner |
| 8,295,215 | B2 | 10/2012 | Morrill et al. |

(Continued)

OTHER PUBLICATIONS

U.S. Appl. No. 12/499,396; Final Rejection dated Aug. 2, 2012; 40 pages.

(Continued)

*Primary Examiner* — Kent Chang
*Assistant Examiner* — Nelson Rosario
(74) *Attorney, Agent, or Firm* — Swanson & Bratschun, L.L.C.

(57) ABSTRACT

Embodiments of the disclosed invention include an apparatus, method, and computer program product for performing automated events using a multi-wireless detection device service platform. For example, in one embodiment, a method for performing automated events in an office environment is disclosed. The method may include logging, by the office management system, a user onto a network data processing system located within an office within the office environment using an account associated with the user in response to receiving a notification message from a wireless detection device. In one embodiment, the communication between the wireless detection device and the office management system to log the user onto the network data processing system located within the office is performed in response to a user-initiated request that indicates that the wireless device is within the office.

20 Claims, 8 Drawing Sheets

(56) References Cited

U.S. PATENT DOCUMENTS

| | | |
|---|---|---|
| 8,447,277 B2 | 5/2013 | Sweeney et al. |
| 8,571,532 B2 | 10/2013 | Sweeney et al. |
| 8,583,078 B2 | 11/2013 | Sweeney et al. |
| 8,768,317 B2 | 7/2014 | Sweeney et al. |
| 8,868,058 B2 | 10/2014 | Morrill |
| 9,094,844 B2 | 7/2015 | Morrill et al. |
| 2002/0032641 A1 | 3/2002 | Mendiola et al. |
| 2003/0018572 A1 | 1/2003 | Beschle et al. |
| 2003/0050854 A1 | 3/2003 | Showghi et al. |
| 2003/0181209 A1 | 9/2003 | Forte |
| 2004/0229621 A1 | 11/2004 | Misra |
| 2005/0083899 A1 | 4/2005 | Babbar |
| 2006/0036868 A1 | 2/2006 | Cicchitto |
| 2006/0135206 A1 | 6/2006 | Louks et al. |
| 2007/0079113 A1 | 4/2007 | Kulkarni et al. |
| 2007/0167170 A1 | 7/2007 | Fitchett et al. |
| 2008/0043676 A1 | 2/2008 | Mousseau et al. |
| 2008/0043993 A1 | 2/2008 | Johnson |
| 2008/0220779 A1 | 9/2008 | Bose |
| 2008/0311943 A1 | 12/2008 | Earl |
| 2009/0059822 A1 | 3/2009 | Morrill et al. |
| 2009/0061924 A1 | 3/2009 | Morrill et al. |
| 2009/0141884 A1 | 6/2009 | Lyman |
| 2009/0156213 A1 | 6/2009 | Spinelli et al. |
| 2009/0164547 A1 | 6/2009 | Ch'ng et al. |
| 2009/0191844 A1 | 7/2009 | Morgan et al. |
| 2009/0288140 A1 | 11/2009 | Huber et al. |
| 2009/0296641 A1 | 12/2009 | Bienas et al. |
| 2010/0041365 A1 | 2/2010 | Lott et al. |
| 2010/0130213 A1 | 5/2010 | Vendrow et al. |
| 2010/0167694 A1 | 7/2010 | Chiussi et al. |
| 2010/0234004 A1 | 9/2010 | Sweeney et al. |
| 2010/0234045 A1 | 9/2010 | Karr et al. |
| 2010/0304764 A1 | 12/2010 | Sweeney et al. |
| 2010/0317371 A1 | 12/2010 | Westerinen et al. |
| 2011/0004747 A1 | 1/2011 | Venkatachalam |
| 2011/0009097 A1 | 1/2011 | Sweeney et al. |
| 2011/0045835 A1 | 2/2011 | Chou et al. |
| 2011/0207461 A1 | 8/2011 | Lundqvist et al. |
| 2012/0046025 A1 | 2/2012 | Das et al. |
| 2012/0052793 A1 | 3/2012 | Brisebois et al. |
| 2013/0223284 A1 | 8/2013 | Davies et al. |
| 2013/0244629 A1 | 9/2013 | Sweeney et al. |
| 2014/0051411 A1 | 2/2014 | Sweeney et al. |
| 2014/0066012 A1 | 3/2014 | Sweeney et al. |
| 2015/0011201 A1 | 1/2015 | Morrill |

OTHER PUBLICATIONS

U.S. Appl. No. 12/499,396; Issue Notification dated May 1, 2013; 1 page.

U.S. Appl. No. 12/499,396; Non-Final Rejection dated Apr. 30, 2012; 32 pages.

U.S. Appl. No. 12/499,396; Non-Final Rejection dated Sep. 17, 2012; 31 pages.

U.S. Appl. No. 12/499,396; Notice of Allowance dated Jan. 18, 2013; 47 pages.

U.S. Appl. No. 12/499,396; Requirement for Restriction/Election dated Apr. 4, 2012; 6 pages.

U.S. Appl. No. 13/872,465; Issue Notification dated Jun. 11, 2014; 1 page.

U.S. Appl. No. 13/872,465; Non-Final Rejection dated Aug. 16, 2013; 35 pages.

U.S. Appl. No. 11/897,937; NonFinal Rejection dated Jun. 24, 2014; 23 pages.

U.S. Appl. No. 11/897,937; Final Rejection dated Nov. 3, 2014; 24 pages.

U.S. Appl. No. 12/471,708; Non-Final Rejection dated May 2, 2014; 52 pages.

U.S. Appl. No. 13/689,892; Non-Final Rejection dated Feb. 28, 2014; 17 pages.

U.S. Appl. No. 13/689,892; Notice of Publication dated Jun. 5, 2014; 1 page.

U.S. Appl. No. 13/689,892; Notice of Allowance dated Jun. 20, 2014; 18 pages.

U.S. Appl. No. 13/872,465; Notice of Allowance dated Feb. 19, 2014; 22 pages.

U.S. Appl. No. 14/075,072; Non-Final Rejection dated Feb. 12, 2014; 54 pages.

U.S. Appl. No. 14/492,141; Notice of Publication dated Jan. 8, 2015; 1 page.

U.S. Appl. No. 11/897,937; Notice of Allowance dated Mar. 25, 2015; 30 pages.

U.S. Appl. No. 14/058,673; Notice of Publication dated Feb. 20, 2014; 1 page.

U.S. Appl. No. 14/058,673; Non-Final Rejection dated Apr. 2, 2015; 28 pages.

WIRELESS SERVICE PLATFORMS

CROSS REFERENCE TO RELATED APPLICATION

This application is a Continuation of U.S. patent application Ser. No. 13/872,465, filed Apr. 29, 2013, and entitled, "Wireless Service Platforms", which is a Continuation of U.S. patent application Ser. No. 12/499,396, (Now U.S. Pat. No. 8,447,277), filed Jul. 8, 2009, and entitled, "Multi-Femto Cell Service Platforms, " both of which is hereby incorporated by reference in its entirety.

BACKGROUND OF THE INVENTION

The disclosed invention is related to the field of cellular communication devices and, in particular, to a femto cell. A femto cell is a small portable low power mobile phone base station that connects to a mobile operator's network using standard broadband DSL or Cable service for improving mobile coverage in areas with obstructed cellular signals, such as, the inside of a house or an office building. In addition, femto cells may provide mobile phone coverage for both voice and data at a lower cost than that of a mobile operator's macro network.

SUMMARY

Embodiments of the disclosed invention include a system, method, and computer program product for performing automated events using a multi-wireless detection device service platform. For instance, in one embodiment, a method is disclosed for performing a user specified action, the method comprising: registering, with a first wireless detection device, an identifier associated with a wireless device, the first wireless detection device located at a first location. The method monitors, using the first wireless detection device, a wireless signal associated with the wireless device. In response to the first wireless detection device detecting the wireless signal associated with the wireless device, the method monitors for an absence of the wireless signal associated with the wireless device. In response to the first wireless detection device detecting the absence of the wireless signal associated with the wireless device, the method transmits a notification to a second wireless detection device indicating that the wireless device is no longer detected by the first wireless detection device, the second wireless detection device being located at a second location. The method monitors for a second notification from the second wireless detection device indicating that the second wireless detection device has detected the wireless signal associated with the wireless device. In one embodiment, the method performs the user specified action in response to not receiving the second notification from the second wireless detection device within a specified time.

In accordance with another embodiment, a method is disclosed for performing automated events in an office environment. In one embodiment, the method may be executed by an office management system. The method comprises registering, with the office management system, a wireless device corresponding to a user. The method receives a notification message from a wireless detection device located within an office of the office environment the notification message indicating the presence of the wireless device within the office. In one embodiment, the method logs the user onto a network data processing system located within the office using an account associated with the user in response to receiving the notification message from the wireless detection device.

Another disclosed embodiment includes a method for performing automated events in an office environment that includes registering, with an office management system, a wireless device corresponding to a user. The method includes receiving, at the office management system, a notification message, from a wireless detection device located within an office environment that indicates the presence of the wireless device within the office environment. The method also comprises logging, by the office management system, the user onto a network data processing system located within an office within the office environment using an account associated with the user in response to receiving the notification message from the wireless detection device. In one embodiment, the communication between the wireless detection device and the office management system to log the user onto the network data processing system located within the office is performed in response to a user-initiated request that indicates that the wireless device is within the office. In certain embodiments, the user initiated request may indicated by the wireless detection device receiving a user-entered key sequence from the wireless device to indicate that the wireless device is within the office.

The above embodiments and other embodiments are further described in the detailed description section of the present application.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
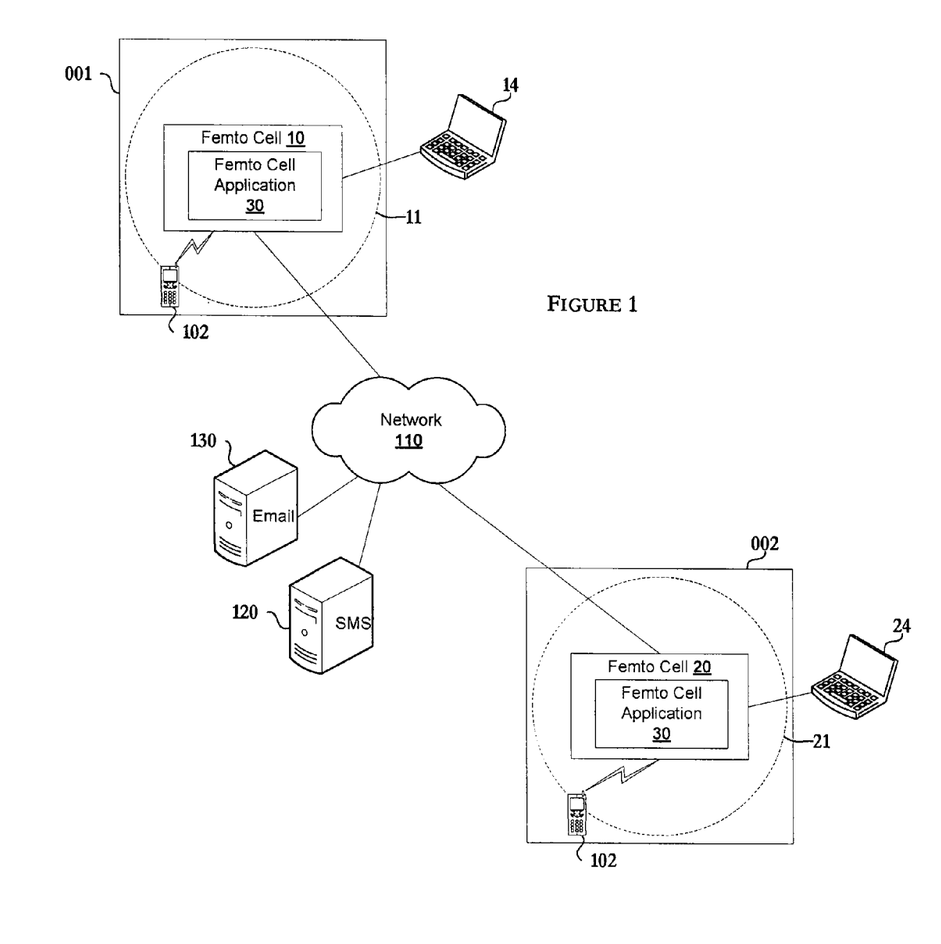
FIG. 1 depicts an embodiment of a decentralized network environment in which certain illustrative embodiments may be implemented.

FIG. 1 depicts an embodiment of a decentralized network environment 100 in which certain illustrative embodiments may be implemented. In the depicted embodiment, one or more femto cells, such as, but not limited to, femto cell 10 and femto cell 20, communicate data directly to one another via a network 110. In one embodiment, femto cell 10 and femto cell 20 are located at two different locations, such as, a location 001 and a location 002. For instance, location 001 may a home location and location 002 may be a school location, a work location, a friend's house, etc. In a preferred embodiment, femto cell 10 and femto cell 20 are used to provide cellular service to cellular devices that are within signal range of the respective femto cells. For example, femto cell 10 and femto cell 20 may be configured to respectively detect cellular signals within a signal coverage area 11 and a signal coverage area 21 and route cellular communications associated with the detected cellular signals over network 110 instead of over a cellular provider's macro network. In other embodiments, femto cell 10 and femto cell 20 may be configured to simply detect and identify cellular devices within signal range without routing/handling the cellular communications associated with the detected cellular devices.

Additionally, in certain embodiments, femto cell 10 and femto cell 20 may execute instruction code, such as, but not limited to, computer executable instructions associated with a femto cell application 30. In one embodiment, femto cell application 30 includes instructions for enabling a user to configure actions and parameters associated with the detection and/or absence of a particular cellular device. For instance, in one embodiment, a user may connect a computer, such as a laptop device 14, to femto cell 10 for enabling a user to register an identifier, e.g., a mobile identification number (MIN) and/or an electronic serial number (ESN), associated with a cellular device that the user wants to be monitored. In a preferred embodiment, laptop device 14 may connect to femto cell 10 using any type of communication means including, but not limited to, a universal serial bus (USB) cable connection, an Ethernet cable connection, and/or via a wireless connection. In one embodiment, femto cell 10 automatically executes instructions associated with femto cell application 30 for displaying a user interface on laptop device 14 for enabling a user to configure femto cell 10 in response to establishing a connection with laptop device 14. In another embodiment, a user may manually initiate the execution of femto cell application 30 for displaying a user interface on laptop device 14. The user interface may be a stand-alone window and/or may be displayed in a Web browser application.

As will be further described, a user may configure femto cell 10 to communicate with one or more femto cells, such as, but not limited to femto cell 20, over network 110, to create a network of femto cells that can communicate information to each other. For instance, in one embodiment, a user may utilize the network of femto cells to track the location of an individual associated with a particular cellular device. For example, a user may register, with femto cell 10 and femto cell 20, a phone number corresponding to a cellular device of a particular person for determining if and when the particular person is located at location 001 and/or location 002. In addition, in some embodiments, femto cell 10 and/or femto cell 20 may be configured to notify a user if a particular person leaves a location, e.g., location 001, and does not arrive at a second location, e.g., location 002, within an expected period of time. For instance, in one embodiment, femto cell 10 may notify femto cell 20 that a cellular device 102 has left the signal range of femto cell 10 and await a response from femto cell 20 indicating that cellular device 102 has arrived at location 002 (i.e., femto cell 20 detects the presence of a cellular signal associated with cellular device 102). In one embodiment, if femto cell 10 does not receive the response from femto cell 20 indicating that cellular device 102 has arrived at location 002 within a specified period of time, femto cell performs a user specified action, such as, but not limited to, notifying a user, e.g., by email and/or SMS text message, that the particular person associated with cellular device 102 did not arrive at location 002 within the specified time. For example, this embodiment may be utilized to ensure that a child that walks from home to school and/or vice versa arrives at the second location within an expected time. In some embodiments, femto cell 10 may be configured to perform a user specified action even if the response is received within a specified time (e.g., to simply notify a parent that the child arrived safely).

As referenced herein, network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). In some embodiments, network 110 may include other types of data networks, such as, but not limited to, an intranet, a private local area network (LAN), a wide area network (WAN), and a wireless local area network (WLAN). In addition, in some embodiments, network 110 may communicate with one or more cellular networks and/or a landline telephone networks for routing data between femto cell 10 and other network devices, such as, but not limited to, a SMS server 120 and an email server 130. For example, in some embodiments, network 110 may communicate with one or more GSM networks, CDMA networks, Enhanced Data GSM Environment (EDGE) networks, PSTN networks, and 3G/4G networks for facilitating data communications between the network devices/systems.

Figure 2:
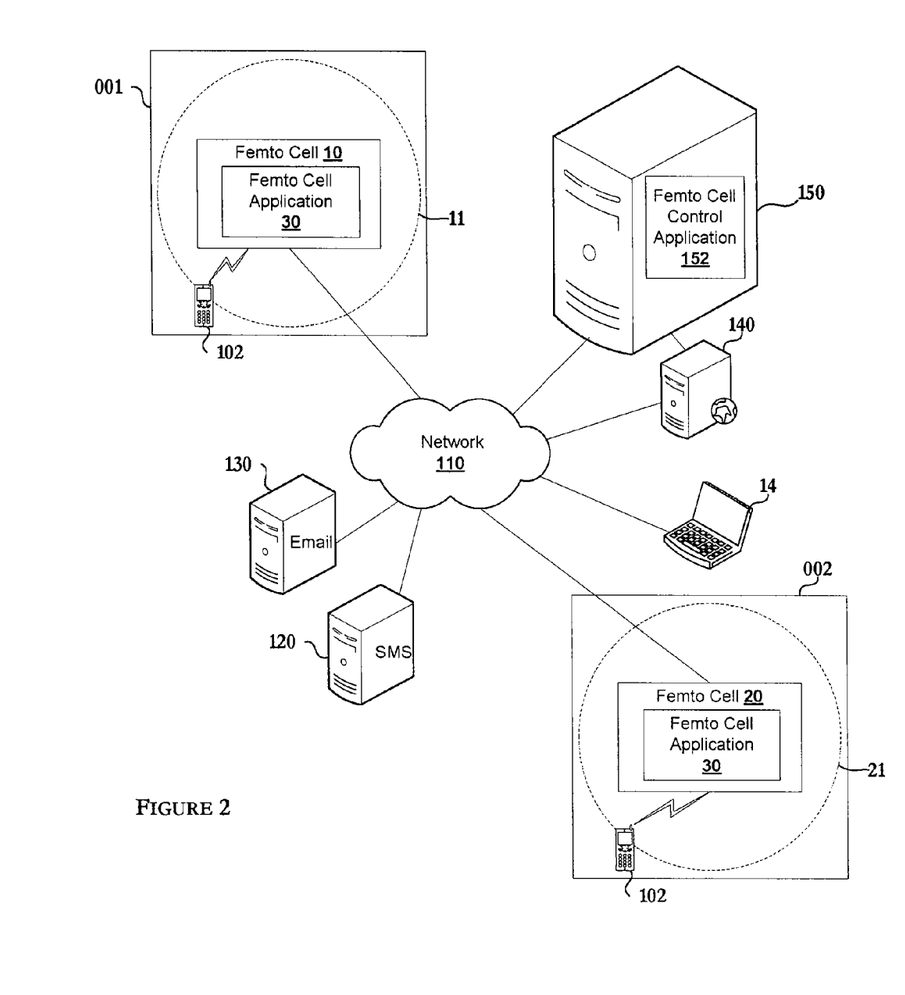
FIG. 2 depicts an embodiment of a centralized network environment in which certain illustrative embodiments may be implemented.

FIG. 2 depicts an embodiment of a centralized network environment in which certain illustrative embodiments may be implemented. In this embodiment, a network of femto cells, such as, but not limited to, femto cell 10 and femto cell 20, communicate information to a central data processing system/server, such as a server 150. In one embodiment, server 150 executes a femto cell control application 152 for enabling a user to configure the actions and parameters associated with the management of the network of femto cells. For instance, in one embodiment, a user may utilize laptop device 14 to communicate with a web server 140 that hosts a website that enables the user to configure the actions and parameters associated with the network of femto cells. Server 150 communicates with web server 140, either directly or via network 110, to receive the user configurations and parameters.

Figure 3:
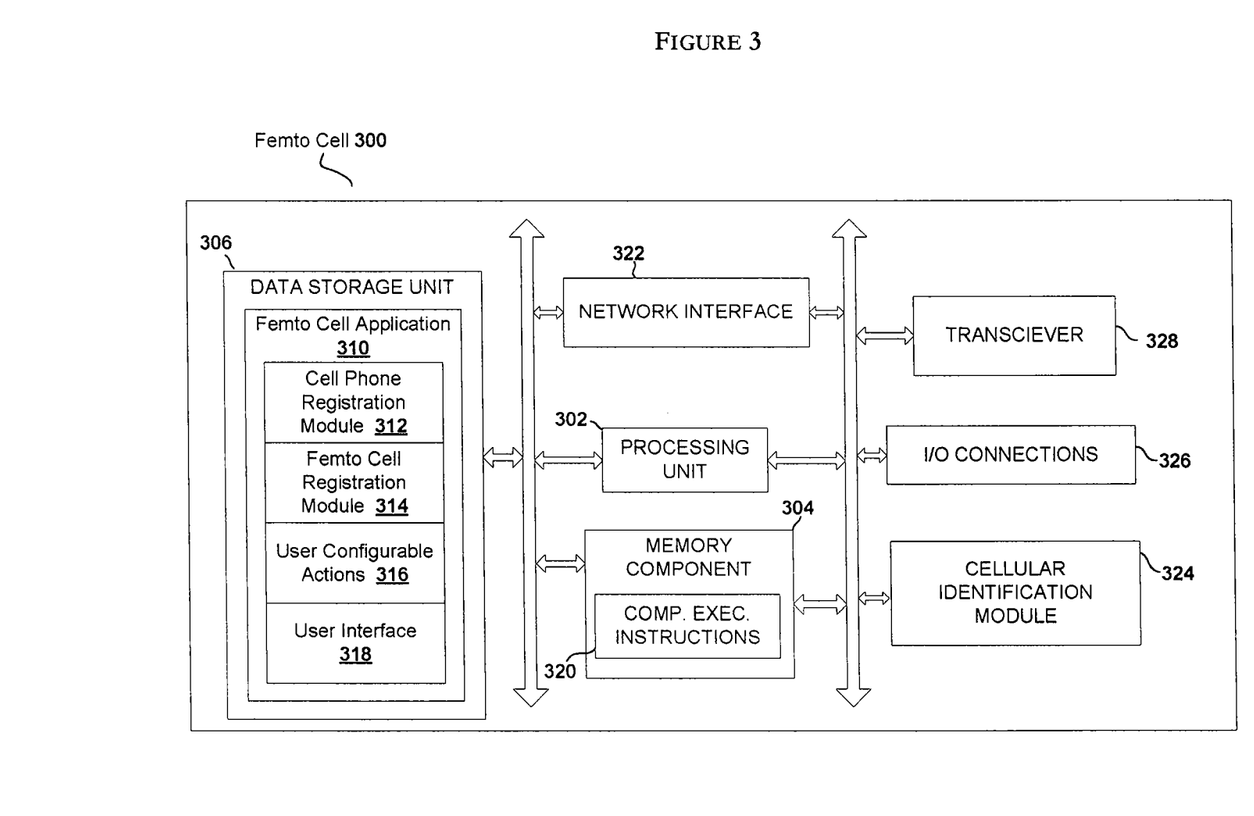
FIG. 3 depicts an embodiment of a femto cell in accordance with certain embodiments of the invention.

FIG. 3 depicts an embodiment of a femto cell 300 in accordance with certain embodiments of the invention. In one embodiment, femto cell 300 includes a processing unit 302, a memory component 304, a data storage unit 306, and a network interface 322. In other embodiments, femto cell 300 may include a system-on-a-chip (SoC) component that integrates all or a majority of the components of femto cell 300, such as, but not limited to, processing unit 302 and memory component 304 (e.g., RAM), into a single integrated circuit chip.

Processing unit 302 may comprise one or more single or multi-core processors including, but not limited to, a central processing unit (CPU), a microprocessor, and/or a digital signal processor for executing computer instructions. In one embodiment, memory 304 is volatile memory. Volatile memory is memory that requires power to maintain stored information. For example, in some embodiments, memory 304 may be random access memory (RAM). Random access memory stores currently executing instructions 320 and/or other data utilized by an operating system, software application and/or other components of femto cell 300. For instance, as will be further described, in one embodiment, computer executable instructions 320 may include instructions for performing a user-specified action in response to detecting the cellular signal associated with a particular cellular device.

Additionally, in a preferred embodiment, femto cell 300 includes a non-volatile data storage device, such as, but not limited to, data storage unit 306. Data storage unit 306 may include one or more data storage units. For example, in one embodiment, data storage unit 306 may be one or more hard disk drives. In other embodiments, data storage unit 306 may be flash memory, such as, but not limited to, an xD (extreme Digital) card, SD (Secure Digital) card, or mini SD card. In some embodiments, data storage unit 306 may be removable and/or an interchangeable with other devices.

In the depicted embodiment, data storage unit 306 includes a femto cell application 310. In one embodiment, femto cell application 310 includes computer executable instruction code for enabling a user to configure actions and parameters associated with monitoring of one or more cellular devices using a network of femto cells. For instance, in one embodiment, femto cell application 310 may include a cell phone registration module 312, a femto cell registration module 314, a user configurable actions module 316, and a user interface module 318. For example, cell phone registration module 312 may include computer executable instructions for receiving an identifier, such as, but not limited to, a mobile identification number (MIN), international mobile equipment identity (IMEI), and/or an electronic serial number (ESN) associated with a cellular device that a user wants to be monitored. Additionally, femto cell registration module 314 may include computer executable instructions for receiving an identifier, such as IP address and a network address, and/or other parameters associated with one or more femto cells in which femto cell 300 may communicate with. In addition, user configurable actions module 316 may include computer executable instructions for enabling a user to configure an action to be performed in response to one or more conditions associated with a monitored cellular device being met. Lastly, user interface module 318 may include computer executable instructions for generating a user interface for enabling a user to perform the above configurations associated with femto cell 300.

In one embodiment, femto cell 300 detects cellular signals using a transceiver 328. In one embodiment, transceiver 328 may include one or more radio frequency (RF) transceivers that are operable to communicate and/or detect cellular signals on a plurality of cellular frequencies. For instance, in some embodiments, femto cell 300 may include one or more transceivers that are operable to communicate cellular signals on a plurality of frequency ranges commonly associated with cellular service providers, such as, but not limited to, 400, 850, 900, 1800, and 1900 MHz frequency bands. In addition, in some embodiments, femto cell 300 may support a plurality of cellular network technologies including, but not limited to, Advanced Mobile Phone Service (AMPS), Narrowband Advanced Mobile Phone Service (NAMPS), Code Division Multiple Access (CDMA), Global System for Mobil communication (GSM), and Personal Communications Services (PCS).

Additionally, in one embodiment, femto cell 300 may include a cellular identification module 324 for identify the MIN (i.e., phone number), IMEI, and/or ESN associated with a detected cellular signal. For example, femto cell 300 may be configured to communicate, on a control channel, with cellular devices that are within signal range of femto cell 300 to determine the mobile identification number/cellular phone number associated with a detected mobile device, similar to the way a macro cellular tower identifies cellular devices within its cellular coverage area. A control channel is a logic channel carrying network information rather than the actual voice or data messages transmitted over the network for enabling cellular devices to identify themselves and their location to the cellular networks.

Additionally, in some embodiments, transceiver 328 may support wireless data communication standards, such as, but not limited to, the Wireless Application Protocol (WAP) and/or Wi-Fi standard, for enabling wireless data communication with one or more wireless Internet accessible devices, such as, but not limited to, laptop device 14. For instance, in one embodiment, a user may utilize laptop device 14 to wirelessly configure femto cell 300. Additionally, in some embodiments, femto cell 300 may include one or more input/output ports 326 (e.g., a USB port) for enabling a user to physically connect laptop 14 to femto cell 300 for enabling a user to configure femto cell 300.

Femto cell 300 communicates to other femto cells and/or other network devices/systems via network interface 322. In some embodiments, network interface 332 may be a network interface card, such as, but not limited to, a modem, an Ethernet card, and/or a wireless network interface card for connecting femto cell 300 to network 110.

Figure 4:
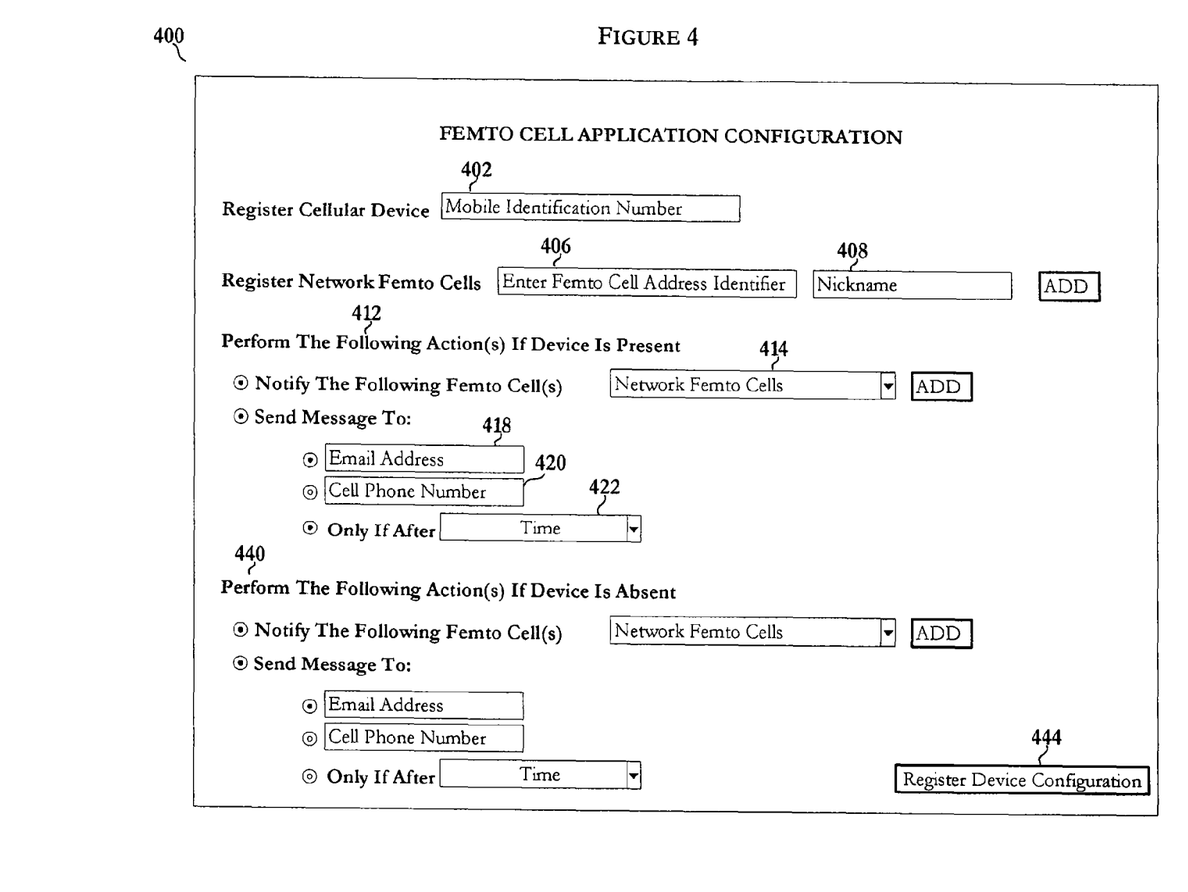
FIG. 4 depicts an embodiment of a user interface in accordance with certain embodiments of the invention.

With reference now to FIG. 4, an embodiment of a user interface 400 in accordance with certain embodiments of the invention is presented. In one embodiment, user interface 400 may be generated by computer executable instructions executed by a femto cell, such as, but not limited to, femto cell 10 and femto cell 20. In other embodiments, user interface 400 may be generated by computer executable instructions executed by a network data processing system such as, but not limited to, server 150.

In the depicted embodiment, user interface 400 includes an input box 402 for registering a cellular device. For example, in one embodiment, a user may enter a mobile identification number/cellular phone number associated with the cellular device that the user wants monitored. In addition, user interface 400 may include a femto cell identifier input box 406 for enabling a user to register an identifier such as an IP address and/or network address associated with a femto cell. In some embodiments, user interface 400 may include a femto cell nickname input box 408 for enabling a user to provide a nickname/alias for a particular femto cell. For instance, a user may have femto cells located at a workplace, a child's school location, a relative's house, a child's friend's house, and/or any other location.

User interface 400 may also include a feature 412 for enabling a user to specify an action to be performed if the registered cellular device is detected by a femto cell. For instance, in one embodiment, if a femto cell detects the cellular signal associated with a registered cellular device, a user may specify that a notification be sent to one or more femto cells selected from femto cell list 414. As will be further described, the communication between the femto cells may enable location tracking of the cellular device. Other actions may include sending a message to a user specified e-mail address 418 and/or a user-specified cellular device 420. Additionally, in some embodiments, a user may specify that the message be sent only if the registered cellular device is detected after a user specified time 422. For example, this option may be utilized to inform a parent that his teenage child has not left for school when he should have left already and/or may be utilized to inform a parent if a child's friend is over past a certain time.

Similarly, in one embodiment, user interface 400 may include one or more user configurable options 440 for configuring a femto cell to perform one or more actions in response to detecting the absence of a registered cellular device. For instance, in one embodiment, a spouse may be automatically notified when the other spouse leaves a workplace for the day. In some embodiments, an employer may track the amount of time an employee may be away from a workstation and/or the time of day an employee leaves.

Figure 5:
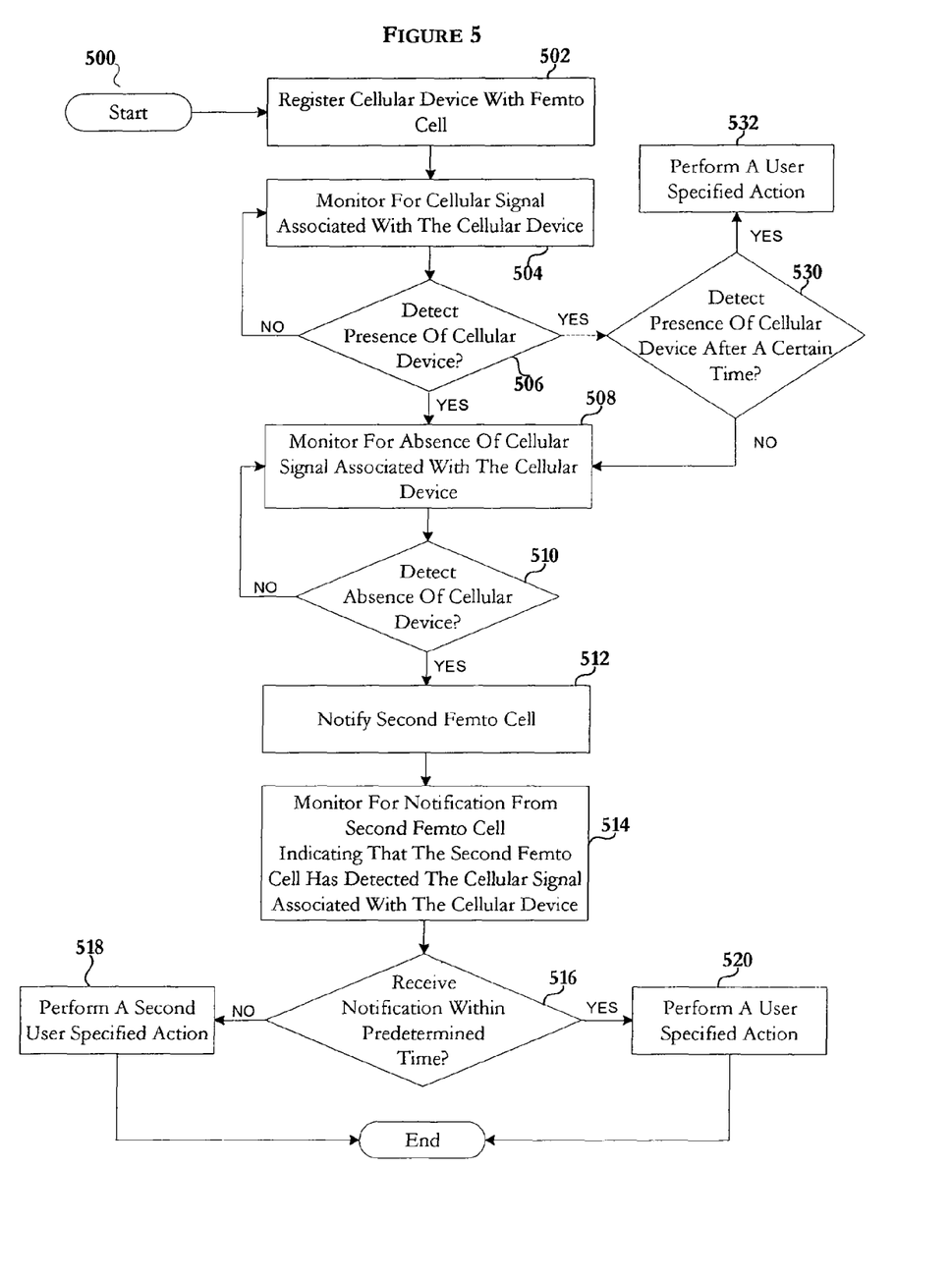
FIG. 5 depicts an embodiment of a process for performing a user specified action in accordance with certain embodiments of the invention.

With reference now to FIG. 5, an embodiment of a process 500 for performing a user specified action is presented in accordance with certain embodiments of the invention. In one embodiment, process 500 may be executed by a femto cell, such as, but not limited to, femto cell 10 and femto cell 20. In another embodiment, process 500 may be executed by a network data processing system such as, but not limited to, server 150. Process 500 may be utilized to track the location of a cellular device using one or more femto cells.

For example, in the depicted embodiment, process 500 begins, at step 502, by registering a cellular device with a femto cell. At step 504, the process monitors for a cellular signal associated with the registered cellular device. The process determines, at step 506, whether the presence of the registered cellular device is detected by a femto cell. In some embodiments, in response to detecting the presence of the registered cellular device at step 506, process 500 may, at step 530, be configured to determine whether the presence of the cellular device is detected after a user-specified time. In these embodiments, if the process determines that the registered cellular device is detected after a user specified time, the process, at step 532, may perform a user specified action.

Alternatively, in another embodiment, if the process, at step 506, detects the presence of the cellular device, the process, at step 508, may monitor for the absence of the cellular signal associated with the registered cellular device. At step 510, the process determines whether the absence of the registered cellular device is detected (i.e., whether the cellular signal associated with the registered cellular device is still within range of the femto cell). In one embodiment, if the process, at step 510, determines that the cellular device is no longer within signal range of the femto cell, the process, at step 512, sends a notification to a second femto cell that the registered cellular device has left the location of the first femto cell. In one embodiment, the notification includes an identifier associated with the registered cellular device.

In addition, in some embodiments, the location associated with the second femto cell may dynamically change based on a time of day that the first femto cell detects the absence of the cellular signal associated with the cellular device. For instance, if the absence of the cellular signal associated with the cellular device is detected early in the morning, the process may monitor a second femto cell located at a school location. On the other hand, if the absence of the cellular signal associated with the cellular device is detected after school hours, the process may monitor a second femto cell located at a neighbor's house.

In one embodiment, the process, at step 514, monitors for a return notification from the second femto cell indicating that the second femto cell has detected the cellular signal associated with the registered cellular device. At step 516, the process determines whether the return notification is received within a user-specified time. In one embodiment, if the process receives the return notification within the user-specified time, the process, at step 520, may perform a user specified action, with process 500 terminating thereafter. Additionally, in one embodiment, if the process does not receive the return notification within the user-specified time, the process, at step 518, may perform a second user-specified action, with process 500 terminating thereafter.

Figure 6:
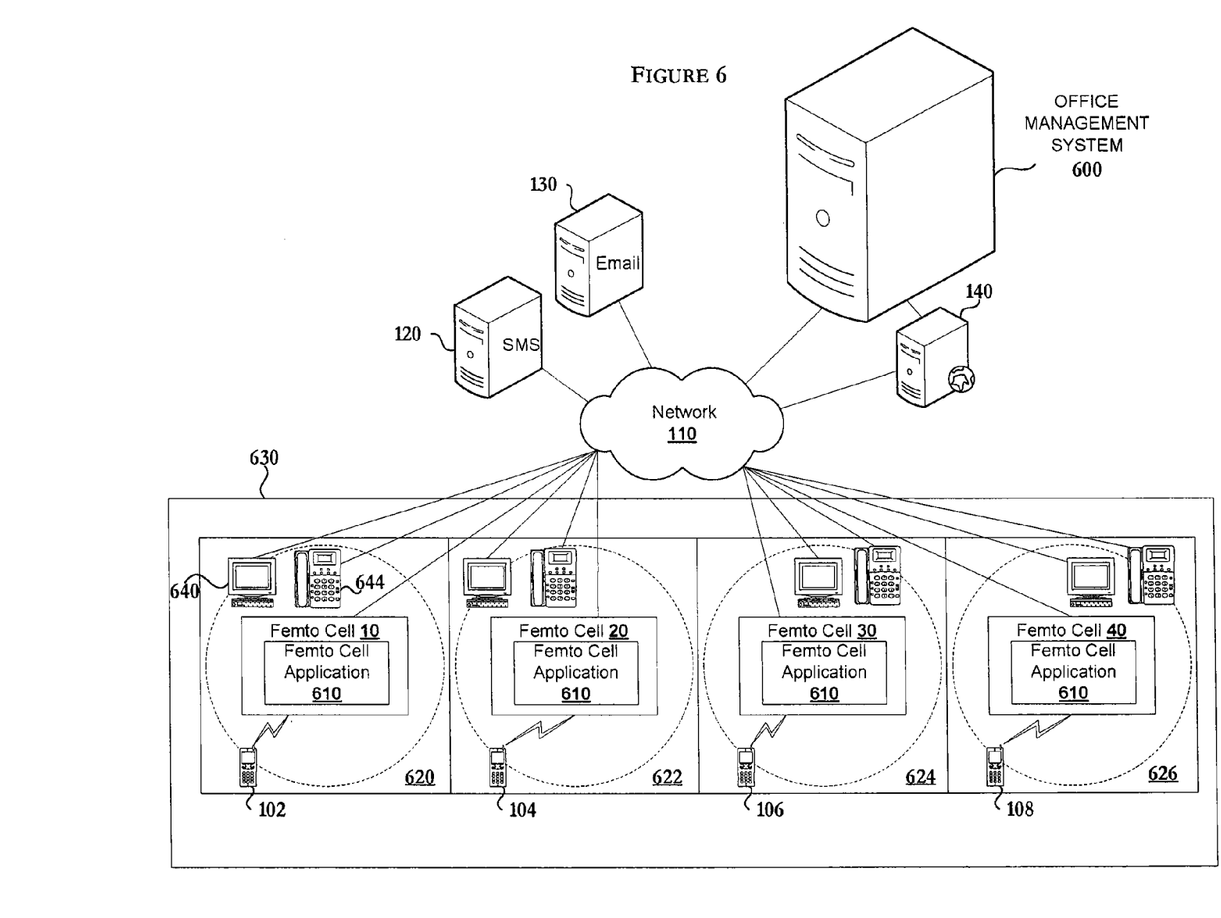
FIG. 6 depicts an embodiment of an office network environment in which certain illustrative embodiments may be implemented.

With reference now to FIG. 6, an embodiment of an office network environment is presented in which certain illustrative embodiments may be implemented. In the depicted embodiment, one or more femto cells, such as, but not limited to, femto cells 10, 20, 30, and 40 communicate data to an office management system 600. In one embodiment, femto cells 10, 20, 30, and 40 are respectively located in individual offices/rooms 620, 622, 624, and 626 of an office environment, such as, office environment 630. An office environment is defined as a place of business. In accordance with one embodiment, femto cells 10, 20, 30, and 40 are configured to automatically detect cellular signals within the respective boundaries of each individual offices/rooms. Offices/rooms 620, 622, 624, and 626 may be individual offices, conference rooms, and/or a designated area of office environment 630.

In certain embodiments, one or more cellular devices, such as, but not limited to, cellular devices 102, 104, 106, and 108 are pre-registered with office management system 600. In one embodiment, the pre-registration process includes associating each cellular device with a particular user. For instance, in some embodiments, office management 600 may communicate with web server 140 for receiving the pre-registration information from a user/office administrator via a website.

In other embodiments, office management system 600 may identify cellular devices 102, 104, 106, and 108 on the fly. For example, in one embodiment, office management system 600 utilizes identifying information, such as, but not limited to, a MIN or an IMEI associated with a cellular device, contain in signals transmitted by the cellular device over a control channel frequency, to identify a cellular device and/or a user associated with the cellular device. In some embodiments, process management system 600 may communicate with a calling names database that contains subscriber names associated with cellular device phone numbers for identifying a user associated with a MIN of a detected cellular device.

In accordance with an embodiment, office management system 600 receives notifications from femto cells 10, 20, 30, and/or 40. The notifications notify office management system 600 that the transmitting femto cell has detected the cellular signals associated with one of the cellular devices. For example, femto cells 10, 20, 30, and/or 40 may execute instructions associated with a femto cell application 610 for identifying a cellular device and/or for identifying a user associated with an identified cellular device. In these embodiments, femto cells 10, 20, 30, and/or 40 may transmit the username information to office management system 600. In other embodiments, femto cells 10, 20, 30, and 40 may simply forward detected cellular signal information to office management 600 for enabling office management 600 to identify a cellular device and a user associated with the cellular device. Additionally, in some embodiments, femto cells 10, 20, 30, and/or 40 may be configured to only forward and/or identify information associated with a cellular device if a user initiates a specified key sequence on a cellular device within range of a femto cell. For example, femto cells 10, 20, 30, and/or 40 may be configured to identify a *45 call as a user initiated request to communicate with office management system 600.

In one embodiment, in response to identifying a cellular device and a user associated with the cellular device, office management system 600 retrieves account information associated with the identified user and uses the account information to log the user onto a network data processing system (e.g., data processing system 640) that is located in the office/room associated with the location of the femto cell (e.g., femto cell 10) that detects the signal of the cellular device. Similarly, in some embodiments, office management system 600 may log a user onto a telephone system (e.g., telephone 644) located within the office/room associated with the location of the detecting femto cell.

In some embodiments, prior to logging the identified user onto a network data processing system that is located within the office/room associated with the transmitting femto cell, office management system 600 may determine whether another user is currently log on to the network data processing system. In one embodiment, if office management system 600 determines that another user is currently log onto the network data processing system located within the particular office/room, office management system 600 may communicate with SMS server 120 and/or e-mail server 130 for sending a message to the cellular device corresponding to the identified user to indicate that the network data processing system within the office is currently in use by a second user.

In addition, in some embodiments, office management system 600 may continue to monitor for the presence of the identified cellular device within the particular office and responsive to a determination that the cellular device is no longer detected by the femto cell located within the particular office, office management system 600 may be configured to automatically log the user out of the network data processing system and/or a telephone system located within the particular office. Accordingly, certain of the disclosed embodiments provide convenience and additional network security by automatically logging a user on and off a network data processing system and/or telephone system based on the presence of a user as determined by the presence of a cellular device associated with the user.

Figure 7:
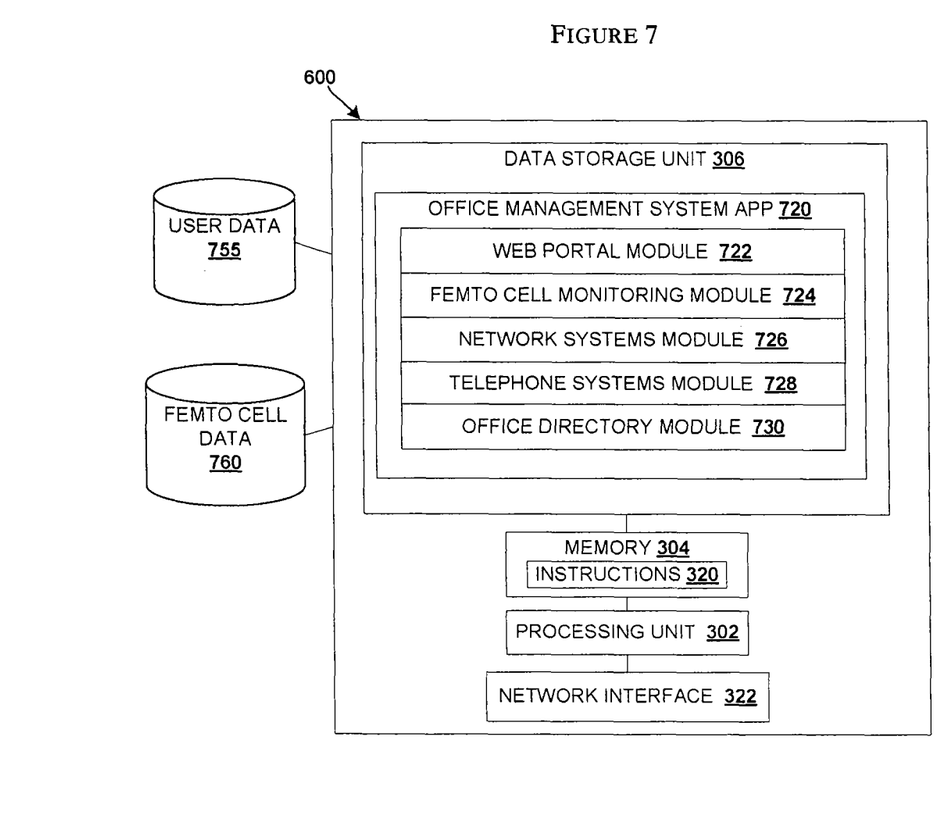
FIG. 7 depicts an embodiment of an office management system in which certain illustrative embodiments may be implemented.

FIG. 7 depicts an embodiment of office management system 600 in which certain illustrative embodiments may be implemented. In one embodiment, office management system 600 may include, among other components, a processing unit 302, a memory component 304, a data storage unit 306, and a network interface 322 as described above with regard to FIG. 3. In one embodiment, office management system 600 executes computer executable instructions associated with office management system application 720 for managing one or more network devices within an office environment by using a plurality of femto cells for identifying the presence of a user, based upon detection of a cellular device associated with the user. For example, in one embodiment, office management system application 720 may include a Web portal module 722, a femto cell monitoring module 724, a network systems module 726, a telephone systems module 728, and an office directory module 730. In addition, office management system application 720 may communicate with one or more databases/data storage units, such as, but not limited to, user database 755 and femto cell database 760, in managing the one or more network devices within the office environment. User database 755 and femto cell database 760 may be databases stored on office management system 600 and/or may be remote databases accessible to office management system 600.

In one embodiment, Web portal module 722 may include computer executable instructions for communicating with a Web server that hosts a website that enables a user to configure one or more actions and/or parameters associated with office management system 600. For instance, an office administrator may access a website to register one or more cellular devices associated with office personnel and for configuring the actions to be performed in response to the detection and/or absence of each registered cellular device. Web portal module 722 provides the application programming interface (API), i.e., a set of functions, procedures, methods or classes, which office management system 600 utilizes to retrieve/receive user configuration parameters from the Web server.

In some embodiments, femto cell monitoring module 724 may include computer executable instructions, such as, but not limited to, communication standards and protocols, for establishing and maintaining communication with one or more femto cells located within an office environment. Additionally, in one embodiment, femto cell monitoring module 724 may utilize information contained in femto cell database 760 for identifying a location within an office environment of a transmitting/monitored femto cell. For example, in one embodiment, femto cell monitoring module 724 may compare an IP address and/or a network address associated with a transmitting/monitored femto cell with a data table that contains a corresponding location associated with the IP address and/or network address of the femto cell. In addition, in some embodiments, femto cell monitoring module 724 may include computer executable instructions for identifying a cellular device and determining a corresponding user associated with the identified cellular device.

Network systems module 726 may include computer executable instructions for automatically logging a user on and/or off of a network data processing system located within an office/room of an office environment. For instance, in one embodiment, in response to identifying a user corresponding to a detected cellular device, network systems module 726 retrieves the user account information/profile from user database 755 for automatically logging a user onto a network data processing system located within an office/room of the office environment in which the transmitting femto cell is located. Similarly, telephone systems module 728 may include computer executable instructions for automatically logging a user on and/or off of a telephone system located within the office/room in which the transmitting femto cell is located.

In some embodiments, office directory module 730 may include computer executable instructions for updating an office directory to indicate that the user is presently located at the office/room of the office environment. For instance, if a user moves from his normal office to a conference room, other office personnel are able to quickly locate the user using the office directory. In addition, in an office environment, such as, but not limited to, a law firm, the office directory may be updated dynamically with attorneys visiting from other office locations. Further, certain of the disclosed embodiments may be utilized in an office environment in which there are no assigned offices and any user may utilize any office that is available.

Figure 8:
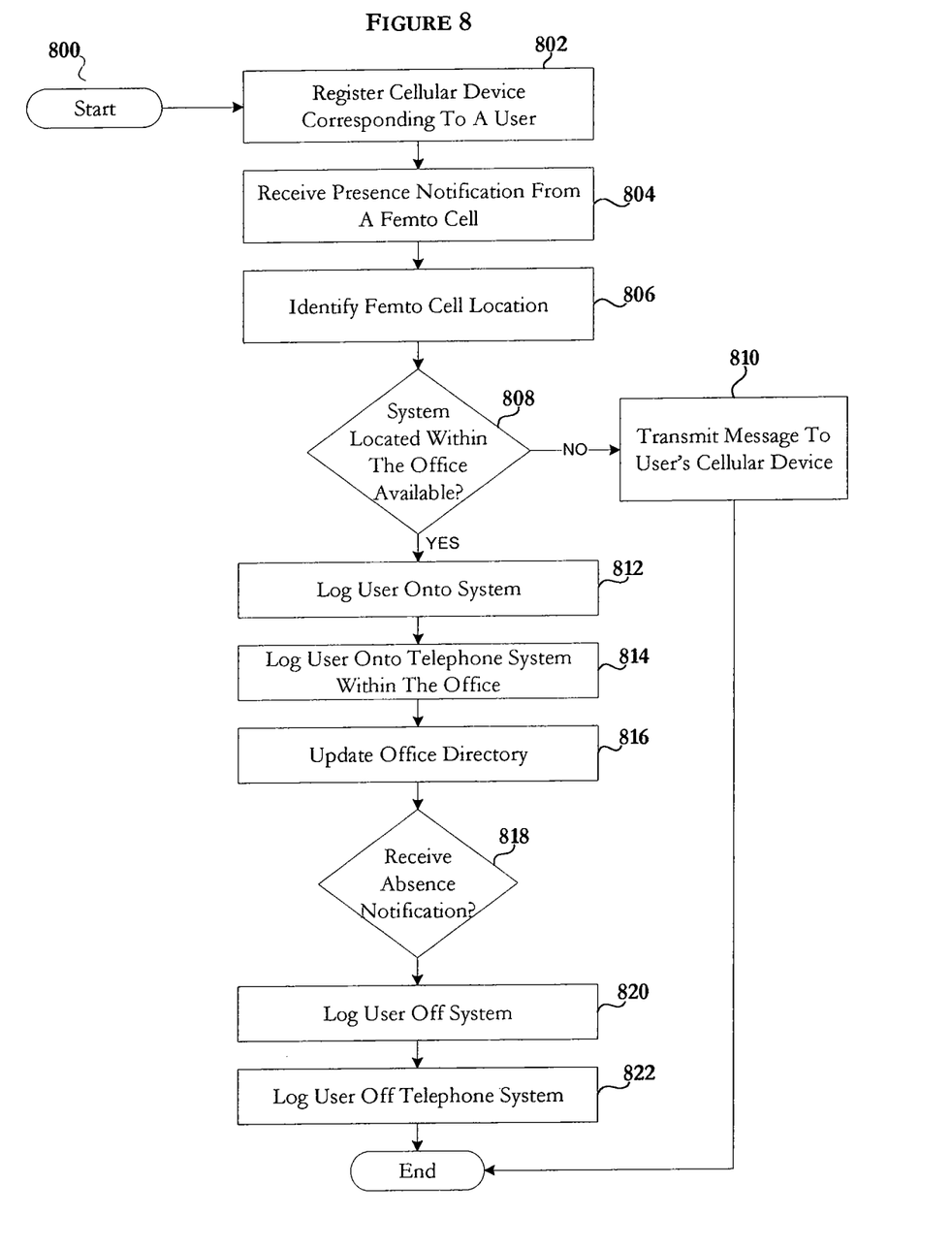
FIG. 8 depicts an embodiment of a process for performing automated events in an office environment in accordance with certain embodiments of the invention.

FIG. 8 depicts an embodiment of a process 800 for performing automated events in an office environment in accordance with certain embodiments of the invention. Process 800 may be executed by a data processing system, such as, but not limited to, office management system 600. Process 800 begins, at step 802, by receiving registration information associated one or more cellular device corresponding to a user. The process monitors/communicates with a plurality of femto cells located within an office environment. The femto cells are utilized to detect cellular signals associated with cellular devices that are located within signal range of a respective femto cell. In one embodiment, in response to detecting a cellular signal associated with a registered cellular device corresponding to a user, the detecting femto cell transmits a presence notification message to the office management system (i.e., indicating that a registered cellular device is detected). At step 804, the process receives the presence notification from the femto cell. The process, at step 806, identifies the location of the transmitting femto cell and identifies a network data processing system that is located in the same office/room as the transmitting femto cell. In one embodiment, the process, at step 808, determines whether the identified network data processing system is available for use. In one embodiment, if the process determines that the identified network data processing system is not available for use, i.e., another user is currently logged on to the system, the process may, at step 810, transmits a message to the cellular device associated with the user to indicate that the network data processing system within the office is currently in use by another user.

However, in one embodiment, if the process determines that the identified network data processing system is available for use, the process retrieves the user account information associated with the identified user and logs the user onto the network data processing system. In some embodiments, the process, at step 814, may also log a user onto a telephone system located within the same office/room. The process, at step 816, may update an office directory to indicate the present location of the user.

Additionally, in some embodiments, the process may continue to monitor communications from the femto cells for identifying when a registered cellular device leaves the signal range of a femto cell. For example, if the process, at step 818, receives an absence notification from a femto cell that indicates that a previously detected cellular device has left the signal range of the femto cell, the process, at step 820, may automatically log the user off of the network data processing system located within the office/room. Similarly, the process, at step 822, may log the user off of the telephone system located within the office/room in response to receiving an absence notification a femto cell.

Accordingly, the above disclosure enables a system and method for performing automated events using a multi-femto cell service platform. For example, in one embodiment, one or more femto cells may communicate directly with each other in a decentralized network for performing user specified actions based on the detection of a cellular device. In other embodiments, the multi-femto cell platform may include a central server, such as, but not limited to, network server 150, for controlling, managing, and monitoring the plurality of femto cells. Additionally, in some embodiments, a multi-femto cell platform may be utilized in an office environment to perform automated events within the office environment, such as, but not limited to, automatically logging a user on and off of a network device based on the presence of a cellular device corresponding to the user.

The above disclosure describes certain embodiments of the claimed invention and is not intended to limit the scope of the claimed invention. In addition, the disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions, hardware components, and/or any combination thereof. In addition, the flowchart and block diagrams in the figures illustrate the architecture, functionality, and operation of possible implementations of systems, methods and computer program products according to various embodiments of the claimed invention. In this regard, each block in the flowchart or block diagrams may represent a module, segment, or portion of code, which may include one or more executable instructions for implementing the specified logical function (s). In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

What is claimed is:

1. A method for performing automated events in an office environment, the method comprising:

registering, with a computer, a wireless device corresponding to a user;

receiving, at the computer, a first notification message, from a wireless detection device, the first notification message indicating presence of the wireless device at a first location;

receiving, with the computer, a second notification message, from the wireless detection device, the second notification message indicating absence of the wireless device from the first location;

determining, with the computer, whether a third notification message has been received from a second wireless detection device, located at a second location, within a specified amount of time;

notifying, with the computer, a second user that a user corresponding to the wireless device did not arrive at the second location within the specified amount of time, based on a determination that the third notification message has not been received within the specified amount of time; and notifying, with the computer, the second user that the user corresponding to with the wireless device safely arrived at the second location, based on a determination that the third notification message has been received within the specified amount of time.

2. The method of claim 1, wherein the first wireless detection device is a femto cell.

3. The method of claim 1, further comprising providing a user interface to receive input defining one or more actions to take upon receiving one or more notification messages from one or more wireless detection devices.

4. The method of claim 3, wherein the one or more actions depend upon a time of day at which the one or more notifications are received.

5. The method of claim 3, wherein the user interface is provided through a web portal.

6. The method of claim 3, wherein the user interface receives input for registering the wireless device, the input including a mobile identification number.

7. The method of claim 1, wherein notifying a user comprises notifying a user via electronic mail message or short message service (SMS) message.

8. The method of claim 1, further comprising:
logging, with the computer, the user onto a network data processing system at the first location in response to receiving the first notification message; and
logging, with the computer, the user off of the network data processing system in response to receiving the second notification message.

9. The method of claim 1, further comprising:
logging, with the computer, the user onto a telephone system at the first location, using a telephone account associated with the user, in response to receiving the notification message from the wireless detection device located within the office;
logging, with the computer, the user off of the telephone system at the first location, in response to receiving the second notification message from the wireless detection device.

10. The method of claim 1, wherein the first location is an office environment, the method further comprising updating, with the computer, an office directory to indicate that the user is located at an office in the office environment.

11. A computer system, comprising:
a data storage unit that stores user account information, wireless detection device location information, and wireless detection device identifiers;
a network interface that receives communications from a plurality of wireless detection devices located within an office environment;
a processing component; and
a memory component that stores instructions executable by the processing component, the instructions comprising:
instructions to register a wireless device corresponding to a user;
instructions to receive a first notification message, from a wireless detection device, the first notification message indicating presence of the wireless device at a first location;
instructions to receive a second notification message, from the wireless detection device, the second notification message indicating absence of the wireless device from the first location;
instructions to determine whether a third notification message has been received from a second wireless detection device, located at a second location, within a specified amount of time;
instructions to notify a second user that a user corresponding to the wireless device did not arrive at the second location within the specified amount of time, in response to a determination that the third notification message has not been received within the specified amount of time; and
instructions to notify the second user that the user corresponding to with the wireless device safely arrived at the second location, in response to a determination that the third notification message has been received within the specified amount of time.

12. The computer system of claim 11, wherein the first wireless detection device is a femto cell.

13. The computer system of claim 11, wherein the instructions further comprise instructions to provide a user interface to receive input defining one or more actions to take upon receiving one or more notification messages from one or more wireless detection devices.

14. The computer system of claim 13, wherein the one or more actions depend upon a time of day at which the one or more notifications are received.

15. The computer system of claim 13, wherein the user interface is provided through a web portal.

16. The computer system of claim 13, wherein the user interface receives input for registering the wireless device, the input including a mobile identification number.

17. The computer system of claim 11, wherein the instructions to notify a user comprise instructions to notify a user via electronic mail message or short message service (SMS) message.

18. The computer system of claim 11, wherein the instructions further comprise:
instructions to log the user onto a network data processing system at the first location in response to receiving the first notification message; and
instructions to log the user off of the network data processing system in response to receiving the second notification message.

19. The computer system of claim 11, wherein the instructions further comprise:
instructions to log the user onto a telephone system at the first location, using a telephone account associated with the user, in response to receiving the notification message from the wireless detection device located within the office;
instructions to log the user off of the telephone system at the first location, in response to receiving the second notification message from the wireless detection device.

20. The computer system of claim 11, wherein the first location is an office environment, and wherein the instructions further comprise instructions to update an office directory to indicate that the user is located at an office in the office environment.

* * * * *